(12) United States Patent
Charhut et al.

(10) Patent No.: US 11,033,836 B2
(45) Date of Patent: *Jun. 15, 2021

(54) CONTINUOUS DEWATERING RECIRCULATION SYSTEM WITH INTEGRAL COAL COMBUSTION RESIDUAL HIGH FLOW PLATE SEPARATOR

(71) Applicants: Daniel Charhut, Lake Bluff, IL (US); Ronald Bugar, Chicago, IL (US); Saurabh Rastogi, Green Oaks, IL (US); Kenneth Lauridsen, Lake Forest, IL (US)

(72) Inventors: Daniel Charhut, Lake Bluff, IL (US); Ronald Bugar, Chicago, IL (US); Saurabh Rastogi, Green Oaks, IL (US); Kenneth Lauridsen, Lake Forest, IL (US)

(73) Assignee: United Conveyor Corporation, Waukegan, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/694,492

(22) Filed: Nov. 25, 2019

(65) Prior Publication Data
US 2020/0086240 A1    Mar. 19, 2020

Related U.S. Application Data

(63) Continuation of application No. 15/723,485, filed on Oct. 3, 2017, now Pat. No. 10,486,087, which is a
(Continued)

(51) Int. Cl.
| | | |
|---|---|---|
| *B01D 21/02* | (2006.01) | |
| *B01D 21/00* | (2006.01) | |

(Continued)

(52) U.S. Cl.
CPC ..... *B01D 21/0087* (2013.01); *B01D 21/0042* (2013.01); *B01D 21/0045* (2013.01);
(Continued)

(58) Field of Classification Search
CPC ............ B01D 21/0045; B01D 21/0087; B01D 21/0093; B01D 21/2405; B01D 21/2488;
(Continued)

(56) References Cited

U.S. PATENT DOCUMENTS

| | | | | |
|---|---|---|---|---|
| 3,429,441 A | * | 2/1969 | Davis ................. | B01D 21/0093 210/524 |
| 3,674,145 A | * | 7/1972 | Schmutzler ............ | B01D 21/34 210/526 |

(Continued)

*Primary Examiner* — Christopher Upton
(74) *Attorney, Agent, or Firm* — Vitale, Vickrey, Niro & Gasey LLP

(57) ABSTRACT

The system for a continuous dewatering recirculating for removing particulate such as coal combustion residue from a water stream. The system includes multiple dewatering and recirculation containers, each having a submerged flight conveyor and lamella settlings plate located therein, at least one dewatering and recirculation container receives ash water stream overflow.

5 Claims, 4 Drawing Sheets

Related U.S. Application Data continuation of application No. 14/847,532, filed on Sep. 8, 2015, now Pat. No. 9,776,106.

(51) Int. Cl.
| | |
|---|---|
| *C02F 1/00* | (2006.01) |
| *B01D 21/24* | (2006.01) |
| *B01D 21/30* | (2006.01) |
| *B01D 21/34* | (2006.01) |
| *C02F 101/10* | (2006.01) |
| *C02F 103/34* | (2006.01) |
| *C02F 103/10* | (2006.01) |
| *C02F 1/52* | (2006.01) |

(52) U.S. Cl.
CPC ....... *B01D 21/0093* (2013.01); *B01D 21/245* (2013.01); *B01D 21/2405* (2013.01); *B01D 21/2427* (2013.01); *B01D 21/2455* (2013.01); *B01D 21/2488* (2013.01); *B01D 21/30* (2013.01); *B01D 21/34* (2013.01); *C02F 1/00* (2013.01); *C02F 1/004* (2013.01); *C02F 1/52* (2013.01); *C02F 2101/10* (2013.01); *C02F 2103/10* (2013.01); *C02F 2103/34* (2013.01); *C02F 2209/42* (2013.01); *C02F 2301/022* (2013.01); *C02F 2301/046* (2013.01)

(58) Field of Classification Search
CPC ..... B01D 21/30; B01D 21/34; C02F 2209/42; C02F 2301/046; F23J 1/02
USPC ................ 210/521, 526, 802, 803
See application file for complete search history.

(56) References Cited

U.S. PATENT DOCUMENTS

| | | | | |
|---|---|---|---|---|
| 3,795,316 | A * | 3/1974 | Wood ..................... | B01D 21/34 210/526 |
| 3,932,280 | A * | 1/1976 | Anderson ................. | F23J 1/02 210/526 |
| 5,011,605 | A * | 4/1991 | Pape ................... | B01D 21/0093 210/253 |
| 5,536,409 | A * | 7/1996 | Dunkers ............ | B01D 21/0045 210/521 |
| 9,776,106 | B2 * | 10/2017 | Charhut ............. | B01D 21/2455 |
| 10,486,087 | B2 * | 11/2019 | Charhut ............. | B01D 21/0093 |
| 2011/0226194 | A1 * | 9/2011 | Mooney ................... | F23J 1/02 122/396 |
| 2016/0001202 | A1 * | 1/2016 | Little ................ | B01D 21/0045 210/803 |

* cited by examiner

CONTINUOUS DEWATERING RECIRCULATION SYSTEM WITH INTEGRAL COAL COMBUSTION RESIDUAL HIGH FLOW PLATE SEPARATOR

RELATED APPLICATION DATA

This application claims priority to utility patent application number U.S. application Ser. No. 15/723,485, filed on Oct. 3, 2017, now issued as U.S. Pat. No. 10,486,087, which claims priority to U.S. application Ser. No. 14/847,532 filed on Sep. 8, 2015, now issued as U.S. Pat. No. 9,776,106.

FIELD OF INVENTION

The present invention relates to a system for continuous dewatering recirculation in combination with an integral high flow plate separator for coal combustion residue and the like. Specifically, the present invention relates to a continuous dewatering recirculation system including multiple retention vessels, wherein the system includes lamella plate assemblies. Preferably, this invention is directed towards submerged drag chain conveyor vessels which are used to remove suspended solids from combustion processes, e.g., coal combustion residue. Each of the submerged drag chain conveyor vessels involves the addition of high flow plate separators for the purpose of better reducing suspended solids. The addition of these separators allow for an improved system so as to support the use of clean water pumps as opposed to less efficient slurry pumps to recirculate the water to material intake points of the system. Thus, a superior continuous dewatering recirculation system with improved efficiency is disclosed.

BACKGROUND OF THE INVENTION

The present invention generally relates to apparatus for separation of solids suspended in a liquid and, more particularly, to an improved lamella-type gravity separator.

Settling tanks and clarifiers have been used for many years to separate solids suspended in water and wastewater. Such approaches include simple concrete or steel tanks where water containing suspended solids flowed in, was retained for a predetermined length of time, and departed, substantially free of suspended solids. Various advancements were made over the years to increase the efficiency of such apparatus; including the incorporation of sludge removal mechanisms, flocculators and sludge recycle mechanisms. Settling tanks, however, are often directed to biological waste and non-abrasive materials having a comparatively small particle size, and thus may be too expensive and insufficiently robust in handling a broad array of operating conditions and particle sizes. Moreover, such systems are often incapable of handling non-ambient fluid streams, such as coal combustion residue water streams.

In recent years, the separation art has included applications of lamella separation. Lamella separation separates solids from a carrying liquid by directing the liquid between series of inclined plates (lamellae). The effective settling area of each lamella plate is equivalent to the horizontal projection of that lamella plate. Lamella plates are typically spaced a few inches apart, with the result that large settling surfaces are concentrated within a relatively small area. The lamella separation promotes laminar flow conditions systems where they are used, which leads to a very high degree of separation. However, such applications are typically impractical for variable flow applications where an adjustment in volume or weir height may be needed. Furthermore, some lamella plate applications may require a high number of lamella plates which may be impractical from the viewpoint of cost and/or operation.

Thus, the present state of the art reflects a need for a system which reliably and efficiently processes coal combustion residue in a continuous dewatering recirculation system while reducing or eliminating any reliance upon a clarifier or other expensive equipment.

DESCRIPTION OF THE PRIOR ART

Examples of existing proposed designs of lamella separator apparatus are disclosed in U.S. Pat. Nos. 3,552,554; 3,706,384; 3,894,955; 4,290,898, 4,681,683, and 4,889,624. Such prior art, however, does not teach the use of lamella technology in variable flow application for the removal of particulate (like coal combustion residue) in a continuous dewatering recirculation system.

US 20110226194 A1 teaches a submerged scraper conveyor (SSC) consisting of a conventional SSC modified to include a slurry processing system, the system including a pair of overflow troughs and associated weirs located exterior to and along the top edge of each side of the horizontal section of the SSC and an underflow baffle. Nothing in this reference, however, teaches or suggests usage with any lamella separator apparatus, much less a system having adjustable weirs or other flow control mechanisms for such systems as disclosed in the present invention.

What is needed is robust, cost effective solution for a continuous dewatering circulation system that enables efficient separation under variable flow conditions.

Definition of Terms

The following terms are used in the claims of the patent as filed and are intended to have their broadest plain and ordinary meaning consistent with the requirements of the law.

A "coal combustion residue water stream" means a solid/liquid phase mixture with the solids generally comprising 1-40% by weight, the solids generally having a specific gravity from approximately 0.5-3.0, and size distributions ranging from submicron particles up to about 1." The solids comprise typically silica and alumina based compounds.

A "continuous dewatering and recirculation container" means a container that includes structures for enabling the continuous filtering, removal and dewatering of particulate contained with the coal combustion residue water stream.

A "variable water level surge tank" can include—but is not limited to—a redundant continuous dewatering and recirculation container. The variable water level surge tank operates to adjust the continuous dewatering and recirculation system so as to maintain a substantially constant volume in a companion continuous dewatering and recirculation container in response to changes of flow streams.

"Filtering" means separation of solid coal combustion residue particulate from the coal combustion residue water stream.

"Lamella settling plates" means a series of generally parallel plates designed to improve filtering of solids by reducing turbulence.

"The number of plates" is a factor which may be influenced by parameters such as the flow rate, specific gravity and particle size distribution of the coal combustion residue water stream, and the geometry of the plates.

"The geometry of the plates" is a factor which may be influenced by the container height and cross-section, the desired modularity and/or ease of removal for maintenance, and the desired efficiency of the plates in situ.

The "Reynolds number" is a dimensionless number that is a ratio of momentum or inertial force to viscous forces. It is used to characterize different flow regimes within a similar fluid, such as laminar or turbulent flow. A Reynolds number may be approximated by knowing the flow rate of the coal combustion residue water, the number of lamella plates, the plate spacing, and width of the plates, and knowing the approximate density and viscosity of the coal combustion residue water stream as understood by those of skill in the art.

An "energy dissipating baffle" is a structure for dissipating momentum in the coal combustion residue water stream upon entering the container.

An "adjustable height weir" means a device to ensure equal distribution flow amongst the lamella plates.

A "drag chain" refers to a chain which generally removes filtered coal combustion residue solids from the bottom of the container. It generally includes a structure supported by the chain (e.g., flights, plates or the like) which drag the solids up and out of the container for further processing.

"Substantially constant water level" means that the height of the water within a given container is relatively unchanged due despite adjustments made in the coal combustion residue water stream flow. (e.g., within 8 inches constancy from front to back in a container of 100 feet).

Where alternative meanings are possible, the broadest meaning is intended. All words used in the claims set forth below are intended to be used in the normal, customary usage of grammar and the English language.

OBJECTS AND SUMMARY OF THE INVENTION

The apparatus and method of the present invention generally includes a system for reducing the particulate in a bottom ash water stream. The components of the systems generally include at least two continuous dewatering and recirculation containers, with each container containing a submerged flight conveyor therein, and each container including lamella plates therein. At least one of the containers is configured to receive coal combustion residue water stream overflow from another of the continuous dewatering and recirculation containers, and the system includes a control mechanism for selecting which container receives ash water stream overflow.

Different, alternative structures from the above described summary are also within the scope of the inventions of the present application. For instance, the present invention may cover systems including only a single dewatering and recirculation container with a surge tank for handling overflow. In such a configuration, only the single tank would require lamella plates and a drag chain, and there would be no need for a control or selection mechanism. Still further alternatives to the above examples include adjustable height weirs connected the lamella settling plates so as to adjust the height of the water in the container so as to improve the efficiency of the filtering by the lamella settling plates.

The immediate application of a present invention will be seen in processing coal combustion residue water streams from operating plants, though those of skill will see that the present invention could be applied to other fields (e.g., bio-mass) requiring a robust and cost effective solution for continuous dewatering recirculation.

Thus can be seen that one object of the present invention is to provide a cost effective system for reducing particulate in a coal combustion residue water stream.

A further object of the present invention is to provide a system using a lamella separation process on a non-laminar flow stream.

Still another object of the present invention is to provide a lamella process on a variable flow rate system.

Yet another object of the present invention is to provide for a system which eliminates the need for a clarifier in a continuous dewatering recirculation system using a fresh water pump.

Still another object of the present invention is to provide a system employing an adjustable weir for a lamella separation process Another object of the present invention is to provide a selectable overflow configuration for a continuous dewatering and recirculation system.

It should be noted that not every embodiment of the claimed invention will accomplish each of the objects of the invention set forth above. In addition, further objects of the invention will become apparent based on the summary of the invention, the detailed description of preferred embodiments, and as illustrated in the accompanying drawings. Such objects, features, and advantages of the present invention will become more apparent in light of the following detailed description of a best mode embodiment thereof, and as illustrated in the accompanying drawings.

DETAILED DESCRIPTION OF THE INVENTION

Set forth below is a description of what is currently believed to be the preferred embodiment or best examples of the invention claimed. Future and present alternatives and modifications to this preferred embodiment are contemplated. Any alternatives or modifications which make insubstantial changes in function, in purpose, in structure or in result are intended to be covered by the claims in this patent.

Figure 1:
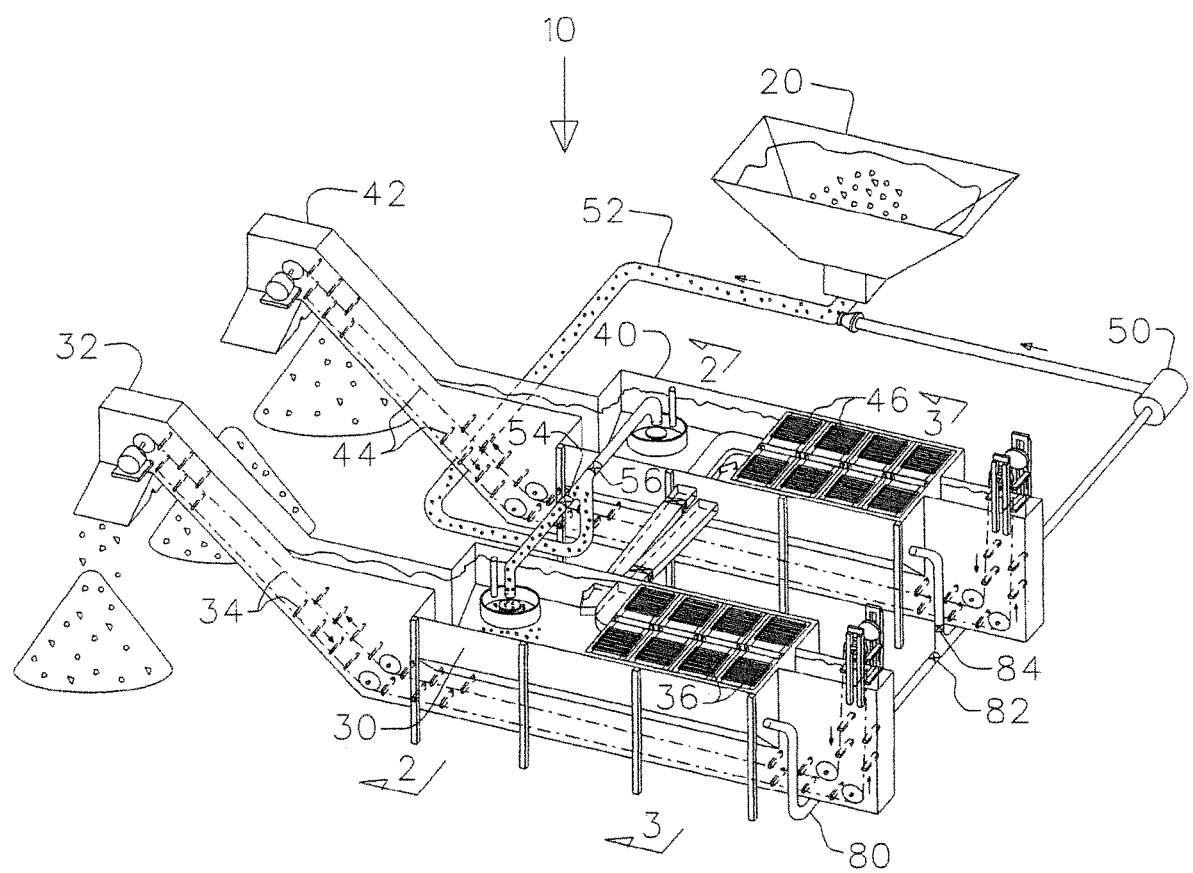
FIG. 1 shows a perspective view of a continuous dewatering circulation system in accord with a first embodiment of the present invention.

FIG. 1 shows a first preferred embodiment constructed in accordance with the present invention. The continuous dewatering system 10 includes a bottom ash hopper 20, a first continuous dewatering and recirculation container 30 and a second continuous dewatering and recirculation container 40. A recirculation system of this type is appropriate where high conveying capacities are required and minimal outage time is needed for conversion. Each of the continuous dewatering and recirculation containers 30, 40 in this embodiment include a submerged flight conveyor 32, 42 including a drag chain 34, 44 for ash particulate from the coal combustion residue water stream received from the bottom ash hopper 20. Each of the dewatering and recirculation containers 30, 40 further includes sets of lamella plates 36, 46 which are responsible for removing the ash/coal combustion residue from the coal combustion residue water stream.

In practice, the coal combustion residue water stream is pumped from the bottom ash hopper 20 via a pump 50 through piping 52. The typical flow rates for systems practicing the present invention is at least 2000 gallons per minute, with a typical flow range being from approximately 2000-9000 gallons per minute. The piping 52 splits into a T delivery configuration, with each of the ends of the T feeding into the respective continuous dewatering and recirculation containers 30, 40. The control of which continuous dewatering and recirculation container receives the coal combustion residue water stream is enabled by a control unit (not shown) and/or direct, manual control of valves 54, 56, which control the flow of the coal combustion residue water stream. As shown in the example of FIG. 1, continuous dewatering and recirculation container 30 is receiving the coal combustion residue water stream, but continuous dewatering and recirculation container 40 is not.

Figure 2:
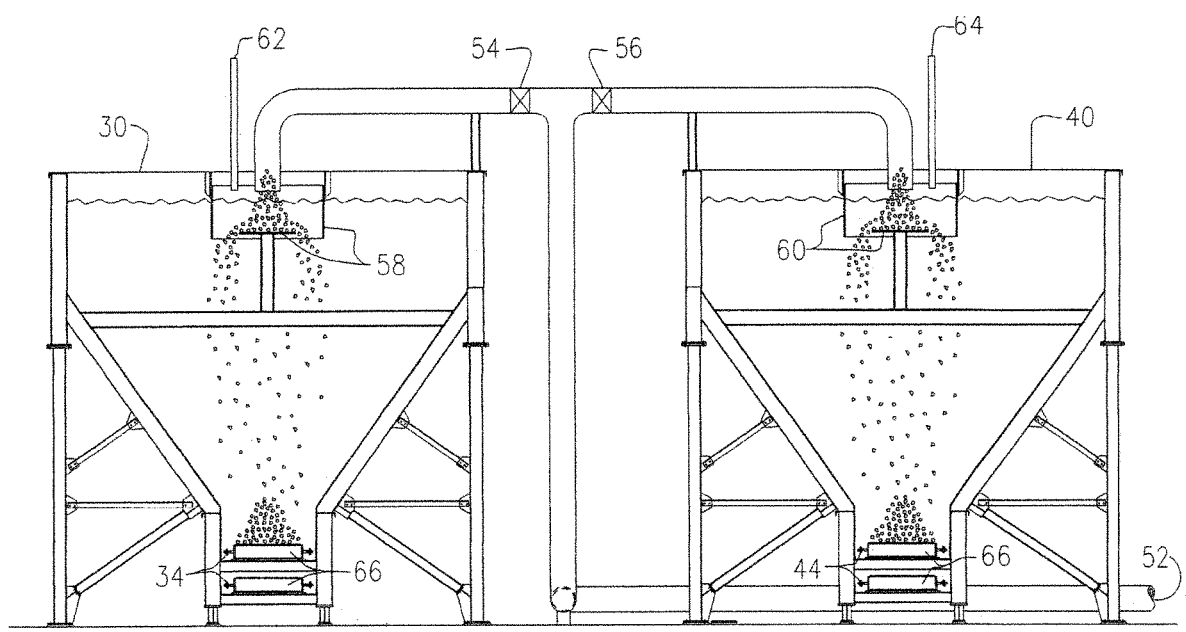
FIG. 2 shows a first cross section view of the continuous dewatering circulation system in accord with a first embodiment of the present invention.

As shown in FIG. 2, the coal combustion residue water stream is delivered out of the ends of the T of piping 52 and impacts upon an energy dissipating baffle 58, 60, which works in conjunction with a floculant injection tube 62, 64. The floculant injection tube 62, 64 selectivelys add a limited amount of floculant to the coal combustion residual water to better separate particulate from the water stream and to enable removal of larger particles from the stream such that they are captured by the flights or plates 66 of the drag chain conveyor 70 so as to be removed from the stream. Furthermore, the speed of the drag chain conveyor 70 is optionally adjustable, for instance, in response to the rate of solids entering the containers 30, 40.

Figure 3:
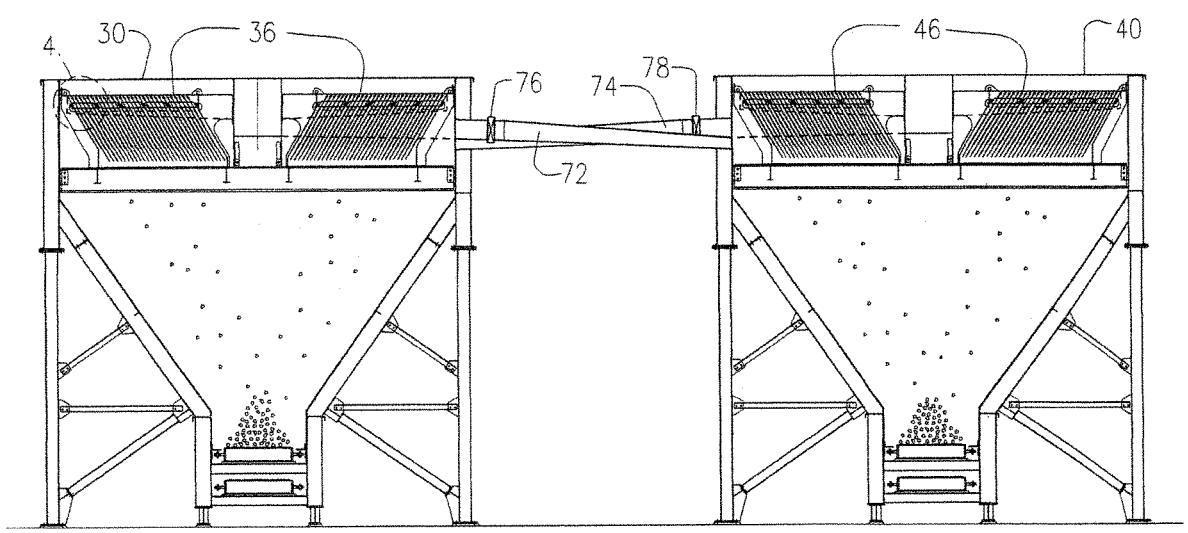
FIG. 3 shows a second cross section view of the continuous dewatering circulation system in accord with a first embodiment of the present invention

As shown in FIG. 3, the present embodiment further removes particulate from the coal combustion residue water stream as the stream travels down the length of the continuous dewatering and recirculation containers 30, 40 by interacting with the sets of lamella plates 36, 46. These sets of plates typically comprise between 150 and 1000 plates for each continuous dewatering and recirculation container 30, 40, and are further typically spaced on the order of two inches apart or more from one another and are preferably angled around 60 degrees from the horizontal (bottom) of the continuous dewatering and recirculation containers 30, 40. Those of skill in the art will understand that the flow of the coal combustion residue water stream, and the number and geometry of plates in the plurality of lamella settling plates, 36, 46 will influence the degree of turbulence. In fact, even using a high flow rate of the coal combustion residue water stream, and employing the number and geometry of plates a described above, the practice of the present invention is nonetheless believed to operate with advantage despite having a turbulent fluid regime (i.e., a Reynolds number of 500+) within the region of lamella settling plates 36, 46.

One important feature in this embodiment in the present invention, as shown in FIG. 3, is the ability to control the level of the coal combustion residue water stream in at least one of the continuous dewatering and recirculation containers 30, 40, i.e., in order to maintain the efficacy of the lamella plates 36, 46. The structures used for maintaining a substantially constant water level along the length of the continuous dewatering and recirculation containers 30, 40 are overflow crossovers 72, 74 and valves 76, 78. These structures enable the system 10 to handle changes in the flow rate of the coal combustion residue water stream while maintaining a constant water level for the container (30 or 40) selected for receiving the coal combustion residue water stream in the first instance (i.e., container 30 in the example of FIG. 1). This constancy in water level provides for improved efficiency of system 10 whereby the lamella plates 36, 46 can settle or filter further particulate in down into the bottom of the containers 30, 40 so as to be captured by the flights or plates 66 of the drain chain conveyor 70 for removal. As shown in FIG. 1, the water from the now cleaned coal combustion residue water stream is removed from the containers 30, 40 through clean water supply piping 80, and selectively passed through valves 82, 84 for recirculation in the system 10.

Figure 4:
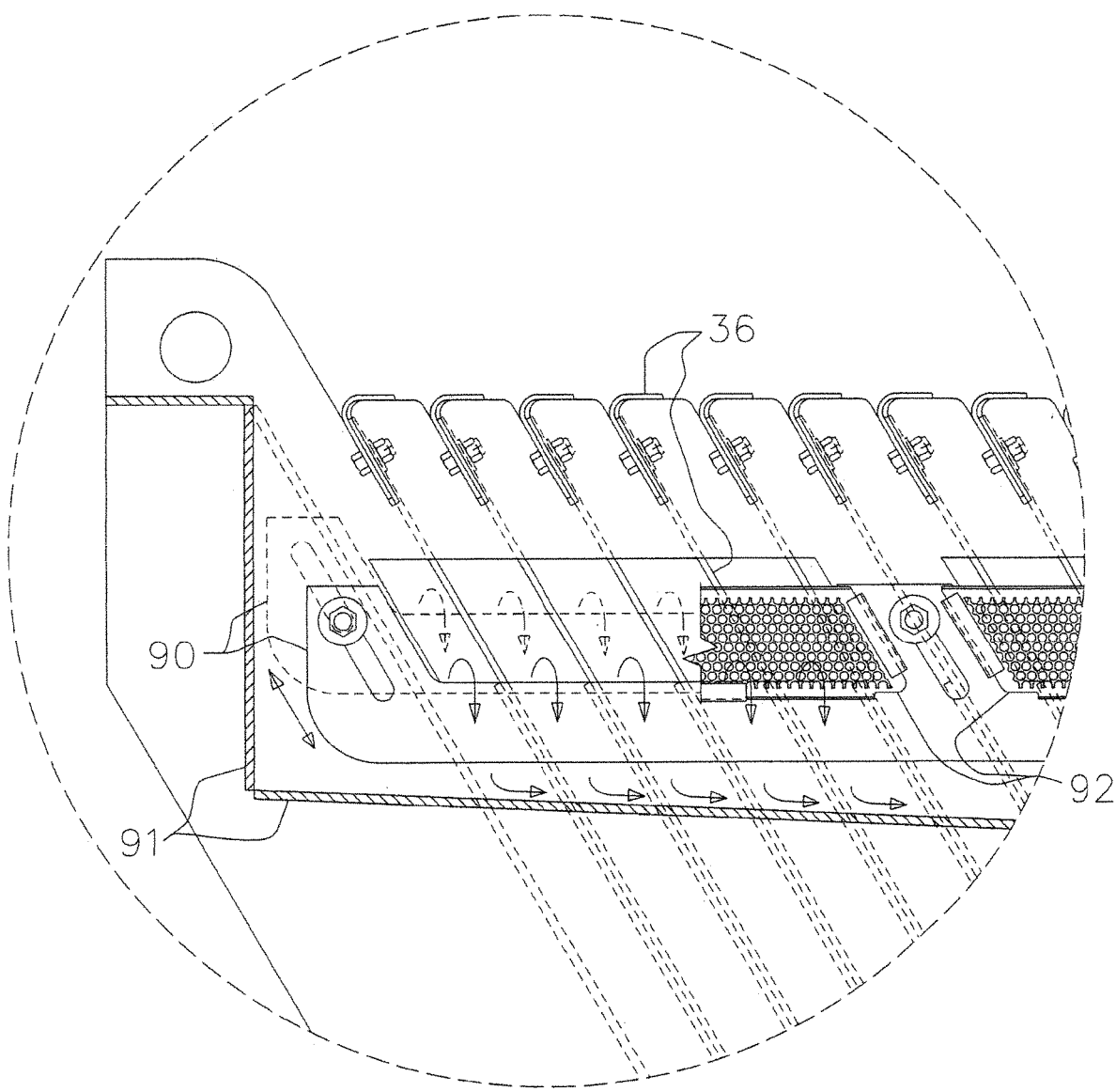
FIG. 4 shows an adjustable weir feature in conjunction with a detail of lamella plates in accord with another embodiment of the present invention.

Optionally, a further feature that can be used in alternative embodiments of the present invention to incorporates an adjustable weir with integral overflow troughs, as shown in FIG. 4. The adjustable weir 90, allows for the overflow to be balanced among several modules of plates 36, 46 in the overall system 10. This weir 90 is designed for overflow from the sides of the plates 36, 46 (rather than over the top as implemented on existing technology). The weir 90 can also incorporate screens (not shown) to handle larger buoyant particles or floaters.

The above description is not intended to limit the meaning of the words used in the following claims that define the invention. Rather, it is contemplated that future modifications in structure, function or result will exist that are not substantial changes and that all such insubstantial changes in what is claimed are intended to be covered by the claims. For instance, the present invention could be employed in a system including just a single container 30 in conjunction with a surge tank (not shown). In addition, the present invention could operate with three or more containers, and can further include a sun shield for the containers to protect from UV exposure and/or structures to enable the plates 36, 46 to be used in a modular fashion and to be walked upon during use. Likewise, it will be appreciated by those skilled in the art that various changes, additions, omissions, and modifications can be made to the illustrated embodiments without departing from the spirit of the present invention. All such modifications and changes are intended to be covered by the following claims.

We claim:

1. A method for reducing the particulate in a bottom ash water stream comprising:
   a) receiving a bottom ash water stream overflow in a first one of a plurality of continuous dewatering and recirculation containers from a second one of a plurality of continuous dewatering and recirculation containers, each of the plurality of continuous dewatering and recirculation containers containing a submerged flight conveyor therein and at least one lamella settling plate located therein,
   b) maintaining a substantially constant water level in the second one of the plurality of continuous dewatering and recirculation containers for filtering the coal combustion residue water stream; and
   c) selecting the first one of the continuous dewatering and recirculation container from among the plurality of continuous dewatering and recirculation containers for receiving ash water stream overflow.

2. The method for reducing the particulate in a bottom ash water stream of claim 1, wherein the at least one lamella settling plates comprises between 150 and 1000 plates for each of the plurality of continuous dewatering and recirculation containers.

3. The method for reducing the particulate in a bottom ash water stream of claim 2, wherein the geometry of at least some of the lamella settling plates includes a slope of at least 60 degrees.

4. The method for reducing the particulate in a bottom ash water stream of claim 1, comprising the further step of generating a non-laminar flow for a coal combustion residue water stream in the second one of the plurality of continuous dewatering and recirculation containers in an amount ranging from 2000-9000 gallons per minute.

5. The method for reducing the particulate in a bottom ash water stream of claim 1 further comprising the step of adjusting the height of weirs connected the at least one lamella settling plate in the second one of the plurality of continuous dewatering and recirculation containers so as to adjust the height of the water in the container so as to improve the efficiency of the filtering by the plurality of lamella settling plates.

* * * * *